United States Patent [19] | [11] 4,112,568

Hale | [45] Sep. 12, 1978

[54] METHOD OF FABRICATING A FLOW DEVICE

[75] Inventor: Robert L. Hale, Kingston, Tenn.

[73] Assignee: The United States of America as represented by the United States Department of Energy, Washington, D.C.

[21] Appl. No.: 802,346

[22] Filed: Jun. 1, 1977

[51] Int. Cl.[2] .............................................. B23P 15/00

[52] U.S. Cl. .................................... 29/157 C; 29/463; 239/592; 239/600; 285/419; 138/171; 138/170; 138/157; 138/156; 138/164

[58] Field of Search ............. 29/157 C, 463; 228/165, 228/166, 167, 176, 214, 174; 239/600, 592; 277/239 R, 168–172, 166, 72 FM; 285/419, 373, 177; 403/310–312; 60/271; 138/171, 170, 164, 157, 156

[56] References Cited

U.S. PATENT DOCUMENTS

| | | | |
|---|---|---|---|
| 392,931 | 11/1888 | Prindle | 277/169 |
| 695,967 | 3/1902 | Thurman | 239/592 |
| 2,007,029 | 7/1935 | Uhri, Jr. | 239/592 |
| 2,256,924 | 9/1941 | Hopkins | 228/165 |
| 2,899,984 | 8/1959 | Gaffin | 285/373 |
| 3,010,151 | 11/1961 | Dickinson et al. | 228/167 |
| 3,058,494 | 10/1962 | Mohr et al. | 138/171 |
| 3,421,652 | 1/1969 | Warman | 29/463 |
| 3,873,135 | 3/1975 | Kreitzberg | 285/419 |

FOREIGN PATENT DOCUMENTS

| | | | |
|---|---|---|---|
| 519,247 | 12/1955 | Canada | 228/165 |

*Primary Examiner*—C.W. Lanham
*Assistant Examiner*—Daniel C. Crane
*Attorney, Agent, or Firm*—Dean E. Carlson; Stephen D. Hamel; Fred O. Lewis

[57] ABSTRACT

This invention is a novel method for fabricating leak-tight tubular articles which have an interior flow channel whose contour must conform very closely with design specifications but which are composed of metal which tends to warp if welded.

The method comprises designing two longitudinal half-sections of the article, the half-sections being contoured internally to cooperatively form the desired flow passageway. Each half-section is designed with a pair of opposed side flanges extending between the end flanges and integral therewith. The half-sections are positioned with their various flanges in confronting relation and with elongated metal gaskets extending between the confronting flanges for the length of the array. The gaskets are a deformable metal which is fusion-weldable to the end flanges. The mating side flanges are joined mechanically to deform the gaskets and provide a longitudinally sealed assembly. The portions of the end flanges contiguous with the ends of the gaskets then are welded to provide localized end welds which incorporate ends of the gaskets, thus transversely sealing the assembly. This method of fabrication provides leak-tight articles having the desired precisely contoured flow channels, whereas various conventional methods have been found unsatisfactory.

8 Claims, 4 Drawing Figures

19'
5
7'
13'
11'
19
13
7
17'
11
28
9
17

METHOD OF FABRICATING A FLOW DEVICE

BACKGROUND OF THE INVENTION

This invention was made in the course of, or under, a contract with the Energy Research and Development Administration. The invention relates generally to methods for fabricating tubular metal articles, such as transitions, diffusers, and flow nozzles. More particularly, it relates to the fabrication of leak-tight tubular articles whose internal dimensions are highly critical, the articles being composed of a metal which tends to warp if fusion-bonded, as by arc welding or gas welding. As used herein, the term "metal" includes metals and metal alloys. The term "welded" as used herein includes brazing.

In the fabrication of certain high-precision apparatus the need arose for a tapered metal flow channel, or nozzle, for conveying gaseous uranium hexafluoride. Specifications called for the nozzle to be leak-tight, to be composed of relatively thin metal compatible with $UF_6$, and to have an internal configuration corresponding very closely to design. A conventional method for fabricating such a nozzle would be to (a) form separate subsections of the nozzle, (b) contour the interior of each subsection by a highly precise technique, and (c) weld the subsections together to provide a leak-tight assembly. Unfortunately, that approach is not satisfactory because the amount of welding required causes the metal to expand appreciably and then distort upon cooling. Another conventional approach is to fabricate a tubular metal housing by standard techniques and then very precisely mount contoured inserts in the housing to define the desired flow channel. That approach is both tedious and costly.

OBJECTS OF THE INVENTION

Accordingly, it is an object of this invention to provide a novel method for fabricating tubular metal articles.

It is another object to provide an improved method for fabricating metal flow nozzles and the like having internal configurations which must correspond very closely to design requirements.

It is another object to provide a method for assembling thin-walled, metal subassemblies with a minimum of welding, brazing, or the like.

It is another object to provide a tubular metal assembly fabricated in accordance with this invention.

SUMMARY OF THE INVENTION

This invention is summarized as follows:

The method of fabricating a tubular metal article comprising: (a) providing two metal subassemblies, each corresponding to a longitudinal half-section of said article, each subassembly being formed with transversely extending end flanges and opposed side flanges which extend between said end flanges; (b) arraying the subassemblies with their corresponding flanges in confronting relation and defining two channels extending for the length of the array, and with elongated gaskets positioned in the channels, said gaskets being composed of metal capable of forming a fusion bond with the subassemblies; (c) mechanically joining the confronting side flanges of the subassemblies to deform said gaskets and longitudinally seal the resulting tubular assembly; and (d) fusing the end portions of said gaskets to portions of said end flanges contiguous therewith to transversely seal said assembly.

BRIEF DESCRIPTION OF THE DRAWINGS

Similar numerals are used to designate corresponding parts of two subassemblies 7 and 7'; the numerals for the latter subsection being primed.

DESCRIPTION OF THE PREFERRED EMBODIMENT

This invention is generally applicable to the fabrication of tubular metal assemblies but for brevity will be illustrated chiefly as employed to fabricate an aluminum-alloy flow nozzle having a precisely contoured axial passageway for conveying gaseous $UF_6$. In the example to be described, the nozzle is formed of a conventional type of aluminum alloy designated as Al-6061-T6.

Figure 1:
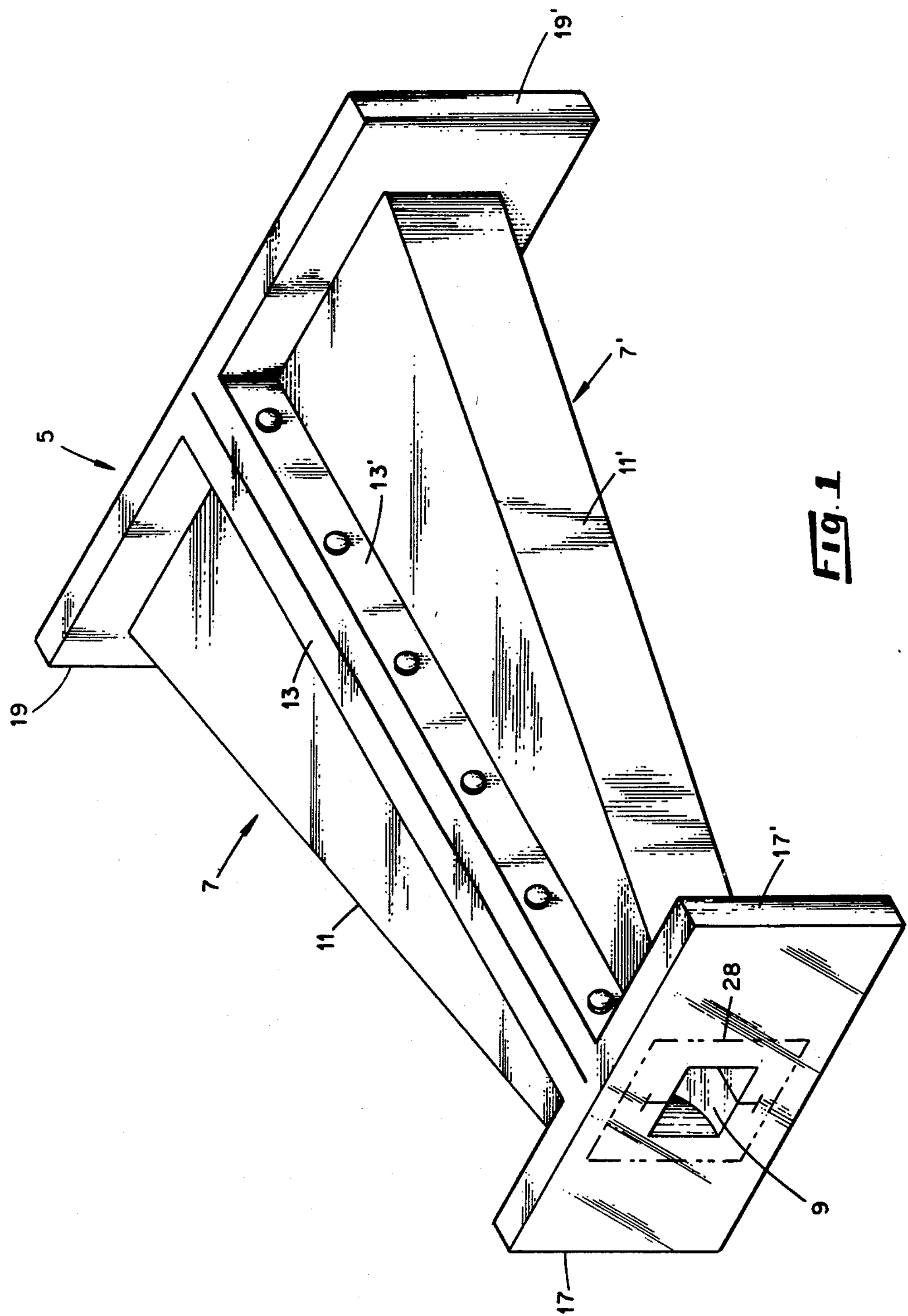
FIG. 1 is a perspective view of a metal flow nozzle fabricated in accordance with this invention.
Figure 2:
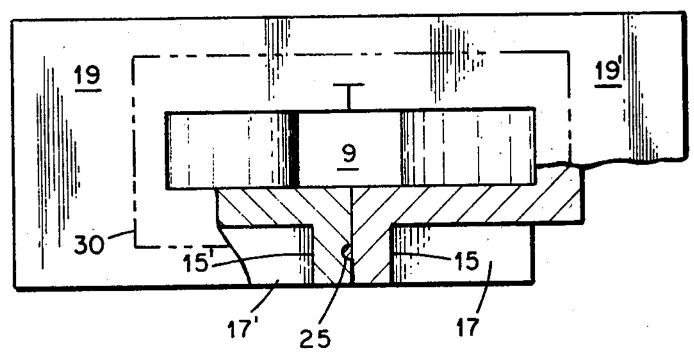
FIG. 2 is an end view of the same.

In accordance with the invention, the first step in the fabrication process comprises providing two elongated subsections, or subassemblies, which are composed of the desired metal and which when mated form a nozzle of the desired configuration. Preferably, the subsections are one-piece longitudinal half-sections of the nozzle. FIGS. 1 and 2 illustrate a flow nozzle 5 which has been assembled from mated longitudinal half-sections 7 and 7' whose interiors have been contoured to cooperatively define a through-going axial flow channel 9 of any desired configuration. The half-section 7, which is typical of both sections, includes a longitudinally tapered body portion 11 having opposed longitudinally extending side flanges 13 and 15, which extend between and are integral with transversely extending end flanges 17 and 19. The side flanges 13 and 15 are provided with bores for receiving bolts or like fasteners.

The subsections 7 and 7' may be formed by any suitable technique which avoids warping or distortion of the metal. For instance, conventional cutting tools may be used to form each subsection from a block of aluminum alloy. If desired, the interior, or flow-passage, portion of the machined blocks may be contoured precisely by means of a more accurate forming technique, as by conventional electrical-discharge machining (EDM). If preferred, the entire half-section may be formed by EDM or the like. In the illustrated embodiment, one member of each mated pair of side flanges is formed with a gasket-receiving groove 20 (FIG. 3) which extends for the length of the array. During the machining operation, the outer portions of the edges formed by the intersections of the various end flanges and side flanges are beveled or otherwise contoured to cooperatively form welding grooves 23 (FIG. 4) when the subsections are assembled. The grooves do not extend to the flow channel 9.

Figure 3:
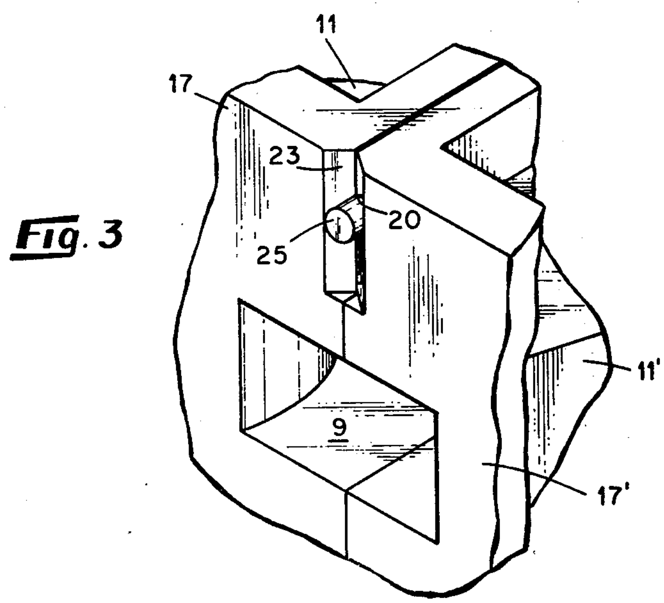
FIGS. 3 and 4 are detail views of a flanged end 17, 17' of the nozzle shown in FIG. 1.

The subsections 7 and 7' next are positioned with their corresponding flanges in confronting relation (FIG. 1) and with elongated, or strip, gaskets 25 (FIGS. 2 and 3) positioned in each of the aforementioned longitudinal grooves 20. (The term "gasket" is used herein to refer to a metal or metal alloy which, when clamped between faces, deforms to provide an interfacial seal.) Preferably, the ends of the gaskets extend into the welding grooves 23, as illustrated in FIG. 3. The gaskets 25 are composed of any suitable metal gasket material which can be fusion-bonded to the end flanges. In this particular example, where the subsections are composed of alloy A1-6061-T6, the gaskets may be aluminum alloy A1-1100.

Figure 4:
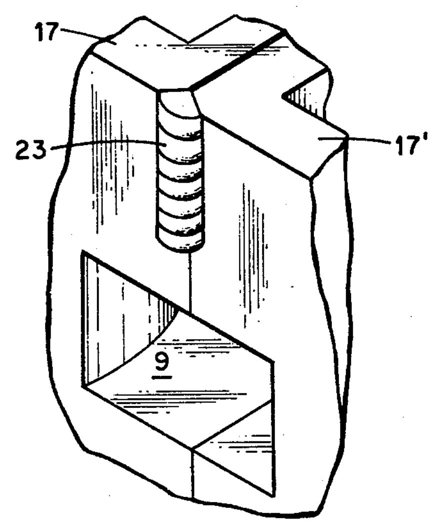

The confronting subsections now are mechanically joined, as with bolts or screws 27, so as to deform the strip gaskets 25 and longitudinally seal the resulting assembly. Then the confronting end flanges are welded by any suitable technique which fuses the ends of the gaskets 25 and the surfaces defining the grooves 23. For example, the grooved portions of the end flanges may be arc welded in conventional fashion, using any suitable filler metal (e.g., aluminum alloy A1-4043). The resulting welds (FIG. 4) transversely seal the assembly, the ends of the gaskets 25 now being incorporated in the fused joint. This welding operation has little or no effect on the contours of the flow channel 9, since relatively little welding is required. As indicated in FIG. 4, the typical weld does not extend to the perimeter of channel 9; preferably, the weld extends to the outer edge of the end flanges.

Following the welding operation, the faces of the end flanges may be machined smooth (as indicated in FIG. 1) to permit the nozzle to be connected into any suitable flow system, as by means of conventional gasketed flange joints. The dotted lines 28 and 30 (FIGS. 1 and 2) outline suitable positions for gaskets incorporated in the joints. As indicated, the gaskets would extend about the flow channel 9 and across the welds (FIG. 4), thus isolating channel 9 from the ambient atmosphere.

The method illustrated above has been used successfully to fabricate precisely contoured flow nozzles for gaseous $UF_6$. For example, nozzles of the kind illustrated in FIG. 1 were fabricated as described. The nozzles were fabricated of A1-6061-T6, the various flanges having a thickness about ½" and the tapered body having a wall thickness of about 1¼". The nozzles had a length of 16", a height of 6", and a width varying from 3" to 10". The finished nozzles were leak-tight. The assembly operations produced no detectable changes in the configuration of the surfaces defining the flow channel 9. The inner ends of the welds were spaced about 1" from the channel 9. The gaskets were composed of A1-1100 aluminum alloy. The welds were produced by standard Heliarc welding, and the filler metal was aluminum alloy A1-4043.

It will be apparent to those versed in the art that this method is applicable to various other tubular articles—e.g., diffusers, couplings, venturi—for conveying various gases or liquids. The articles may be composed of various metals and alloys, so long as the gaskets 25 are fusion-bondable with the end flanges to form a leak-tight joint therewith when joined as described. Where the tubular article is to be used to convey a relatively non-corrosive fluid, the subsections may, for example, be composed of steel and the gaskets 25 of stainless steel or Monel; the filler metal may be stainless or Monel, respectively. As another illustration, the subsections may be steel, the gasket 25 may be copper, and the filler metal any compatible brazing material. The selection of other compatible systems for use with various fluids is within the skill of the art. Arc welding is a particularly suitable preferred technique for transversely sealing the end flanges, but other conventional fusion techniques, such as gas welding, also may be employed. It is not essential that welding grooves (23, FIG. 3) be provided. Neither is it essential that the ends of the gaskets 25 extend outwardly of the end flanges as shown in FIG. 3. If desired, the grooves 23 might be formed after the subsections are bolted together. It will be apparent that other modifications can be made within the scope of the invention as defined in the following claims.

What is claimed is:

1. The method of fabricating a tubular metal article comprising:

(a) providing two metal subassemblies, each corresponding to a longitudinal half-section of said article, each subassembly being formed with transversely extending end flanges and opposed side flanges which extend between said end flanges;

(b) arraying the subassemblies with their corresponding flanges in confronting relation and defining two channels extending for the length of the array, and with elongated gaskets positioned in the channels, said gaskets being composed of metal capable of forming a fusion bond with the subassemblies;

(c) mechanically joining the confronting side flanges of the subassemblies to deform said gaskets and longitudinally seal the resulting tubular assembly; and (d) fusing the end portions of said gaskets to portions of said end flanges contiguous therewith to transversely seal said assembly.

2. The method of claim 1 wherein said fusing is accomplished by welding.

3. The method of claim 1 wherein said contiguous portions cooperatively define welding grooves.

4. The method of claim 3 wherein the ends of said gaskets respectively extend into said grooves.

5. The method of fabricating a tubular metal-article comprising:

(a) providing two metal subassemblies, each corresponding to a longitudinal half-section of said article, each subassembly having radially extending end flanges and a pair of opposed external side flanges extending between and sealed to said end flanges, the outer portions of the edges formed by the intersection of said side flanges and end flanges being cut away;

(b) positioning the subassemblies with their corresponding flanges in confronting relation so that the corresponding cut-away portions cooperatively form grooves and with metal gaskets positioned between the confronting flanges, the end portions of the gaskets extending into different ones of said grooves, said gaskets being of deformable metal which is fusion-bondable to said end flanges;

(c) mechanically joining the confronting flanges to deform said gaskets and provide a longitudinally sealed tubular assembly; and (d) fusion-bonding the ends of said gaskets to the surfaces defining the grooves associated therewith.

6. The method of claim 5 wherein each of said subassemblies is machined from a block of said metal.

7. The method of claim 5 wherein faces of said end flanges are machined smooth after welding.

8. The method of claim 5 wherein said subassemblies and gaskets are composed of aluminum alloy.

* * * * *